(12) United States Patent
Hashizume (10) Patent No.: US 7,489,426 B2
(45) Date of Patent: Feb. 10, 2009

(54) IMAGE READING APPARATUS AND IMAGE READING METHOD

(75) Inventor: Yusuke Hashizume, Urayasu (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1061 days.

(21) Appl. No.: 10/800,666

(22) Filed: Mar. 16, 2004

(65) Prior Publication Data
US 2005/0206977 A1  Sep. 22, 2005

(51) Int. Cl.
*H04N 1/04* (2006.01)

(52) U.S. Cl. ............... 358/514; 358/474; 358/505; 250/208.1

(58) Field of Classification Search ........... 358/486, 358/474, 463, 465, 406, 504, 505, 500, 1.9, 358/514, 512, 483, 513, 482; 250/208.1; 382/274, 275
See application file for complete search history.

(56) References Cited

U.S. PATENT DOCUMENTS

| | | | |
|---|---|---|---|
| 7,072,075 B2 * | 7/2006 | Kondo et al. ............ | 358/1.9 |
| 7,268,914 B2 * | 9/2007 | Noguchi et al. .......... | 358/1.9 |
| 2002/0176104 A1 * | 11/2002 | Noguchi et al. .......... | 358/1.9 |
| 2004/0057616 A1 * | 3/2004 | Kondo et al. ............ | 382/275 |
| 2004/0174576 A1 * | 9/2004 | Kamisuwa et al. ....... | 358/514 |
| 2004/0196514 A1 * | 10/2004 | Tanimoto et al. ......... | 358/514 |
| 2004/0201872 A1 * | 10/2004 | Horaguchi et al. ....... | 358/500 |
| 2004/0223196 A1 * | 11/2004 | Tanimoto et al. ......... | 358/514 |
| 2007/0109605 A1 * | 5/2007 | Shimizu ................. | 358/463 |

FOREIGN PATENT DOCUMENTS

| JP | 11-220569 A | | 8/1999 |
|---|---|---|---|
| JP | 2002-271631 | * | 9/2002 |

OTHER PUBLICATIONS

U.S. Appl. No. 10/787,077, filed Feb. 27, 2004, Hashizume et al.
U.S. Appl. No. 10/788,350, filed Mar. 1, 2004, Ide.
U.S. Appl. No. 10/370,732, filed Feb. 24, 2003, Hashizume et al.

* cited by examiner

*Primary Examiner*—David K Moore
*Assistant Examiner*—Henry Dahbour
(74) *Attorney, Agent, or Firm*—Foley & Lardner LLP (57) ABSTRACT

An image reading apparatus includes a sensor section which includes a color line sensor which reads a color image and a monochrome line sensor which reads a monochrome image provided in parallel with and a specific distance away from the color line sensor, an input section which inputs a document image to the color line sensor and the monochrome line sensor, and a control section which, when reading an image from a document by use of the input section, starts the reading of an image by the color line sensor and the reading of an image by the monochrome line sensor with the same timing.

3 Claims, 8 Drawing Sheets

IMAGE READING APPARATUS AND IMAGE READING METHOD

BACKGROUND OF THE INVENTION

1. Field of the Invention

This invention relates to an image reading apparatus and an image reading method which use line sensors.

2. Description of the Related Art

An image reading apparatus and an image reading method which use line sensors to read images are well known. For instance, an image reading apparatus uses three line CCD (Charged-Coupled Device) sensors provided with red (R), green (G), and blue (B) filters respectively to generate RGB signals, thereby reading a color image. The apparatus generates a monochrome image by using the read RGB signals. Therefore, as for the starting position to read an image, the apparatus can start to read the image from the same place, taking no account of whether the image is a color image or a monochrome image.

Another known image reading apparatus has three color line CCD sensors provided with red (R), green (G), and blue (B) filters respectively and a monochrome line CCD sensor with no color filter. The color line CCD sensors are composed of physically different members from that of the monochrome line CCD sensor. These sensors are separated by a specific distance in the apparatus. Therefore, when an image is read from a document, it is necessary to change the starting position of image reading for each of the line sensors according to the reading mode. Since the starting position of image reading differs as described above, this apparatus, unlike the above apparatus, requires complex control in reading images, which results in a control load on the apparatus.

Therefore, there has been a need for an image reading apparatus and an image reading method which are capable of reducing the control load when the color line CCD sensors and the monochrome line CCD sensor are used to read images.

BRIEF SUMMARY OF THE INVENTION

According to an aspect of the present invention, there is provided an image reading apparatus comprising: a sensor section which includes a color line sensor which reads a color image and a monochrome line sensor which reads a monochrome image provided in parallel with and a specific distance away from the color line sensor; an input section which inputs a document image to the color line sensor and the monochrome line sensor; and a control section which, when reading an image from a document by use of the input section, starts the reading of an image by the color line sensor and the reading of an image by the monochrome line sensor with the same timing.

Objects and advantages of the invention will become apparent form the description which follows, or may be learned by practice of the invention.

BRIEF DESCRIPTION OF THE SEVERAL VIEWS OF THE DRAWING

The accompanying drawings illustrate embodiments of the invention, and together with the general description given above and the detailed description given below, serve to explain the principles of the invention.

DETAILED DESCRIPTION OF THE INVENTION

Hereinafter, referring to the accompanying drawings, embodiments of the present invention will be explained.

First Embodiment

Figure 1:
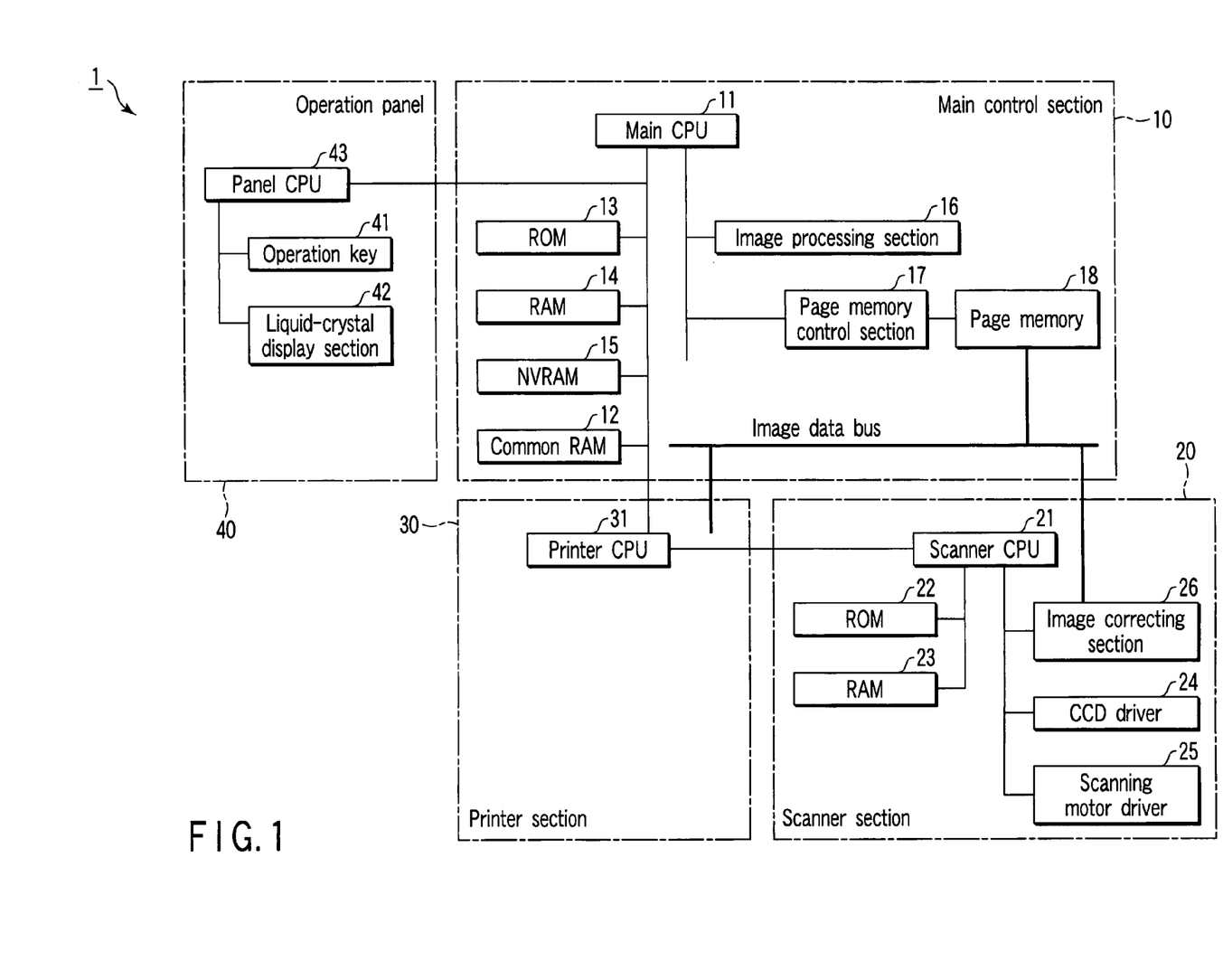
FIG. 1 is a block diagram schematically showing the electrical connection of an image reading apparatus according to a first embodiment of the present invention and the flow of control signals.

FIG. 1 is a block diagram schematically showing the electrical connection of an image reading apparatus 1 and the flow of control signals. In FIG. 1, the control system is composed of three CPUs (Central Processing Units), a main CPU 11 in a main control section 10, a scanner CPU 21 of a scanner section 20, and a printer CPU 31 of a printer section 30. These CPUs are connected via a common bus. The main CPU 11 establishes two-way communication with the printer CPU 31 via a common RAM 12. The main CPU 11 is designed to give an operation instruction and the printer CPU 31 is designed to return a state status. The printer CPU 31 and scanner CPU 21 establish a serial communication. The printer CPU 31 is designed to give an operation instruction and the scanner CPU 21 is designed to return a state status. The common bus is a completely synchronous bus, such as a PCI bus. An address bus and a data bus use the same signal line in a time-shared manner. It enables that a program I/O transfer via a CPU and a data transfer according to a bus master, which peripheral devices controls the buses and accesses a memory or the like directly.

An operation panel 40 includes various operation keys 41, a liquid-crystal display section 42, and a panel CPU 43 to which these are connected. Use of the various operation keys 41 makes it possible to specify, for example, a reading mode, such as a color mode for reading color images or a monochrome mode for reading monochrome images. The panel CPU 43 is connected to the main CPU 11.

The main control section 10 is composed of the main CPU 11, a ROM 13, a RAM 14, an NVRAM 15, an image processing section 16, a page memory control section 17, and a page memory 18. The main CPU 11 supervises overall control. In the ROM 13, a control program and the like for the main CPU 11 are stored. The RAM 14 stores various types of data temporarily. The NVRAM (nonvolatile random access memory) 15, which is a nonvolatile memory backed up by a battery (not shown), is capable of holding the stored data even when the power is cut off. The page memory control section 17 stores or reads image information into or from the page memory 18. The page memory 18 has an area capable of holding a plurality of pages of image data.

The scanner section 20 is composed of the scanner CPU 21 supervising overall control, a ROM 22 in which control programs and the like have been stored, a data storage RAM 23, a CCD driver 24 for driving each of the line CCD sensors of a 4-line CCD sensor section 27 explained later, a scanning motor driver 25 for controlling the rotation of a scanning motor to move a first carriage 51 and the like, and an image correcting section 26. The image correction section 26 is composed of an A/D converting circuit for converting an analog signal from each line CCD sensor into a digital signal, a shading correcting circuit for correcting a fluctuation in the threshold level with respect to the output signal from the line sensor caused by a variation in the individual line CCD sensors or a change in the ambient temperature, and a line memory for storing the shading-corrected digital signal from the shading correcting circuit temporarily.

The printer section 30 forms an image on the basis of the image data input to a laser driver (not shown) via an image data bus. Since the printer section has the same configuration as that of a conventional equivalent, explanation of it will be omitted.

Figure 2:
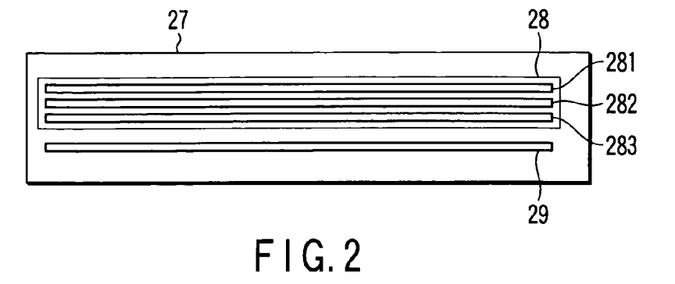
FIG. 2 shows a 4-line CCD sensor section.

FIG. 2 shows the 4-line CCD sensor 27 the scanner section 20 has. The 4-line CCD sensor section 27 is composed of a color line CCD sensor 28 and a monochrome CCD sensor 29. The color line CCD sensor 28 and the monochrome line CCD sensor 29 are separate units. The monochrome line CCD sensor 29 is provided in the 4-line CCD sensor section 27 so as to be in parallel with and a specific distance away from the color line CCD sensor 28. The color line CCD sensor 28 is composed of three line CCD sensors 281, 282, 283 provided with a red (R), a green (G), and a blue (B) filter, respectively. The line CCD sensors 281, 282, and 283 output an R signal, a G signal, and a B signal, respectively. The monochrome line CCD sensor 29 is composed of only a single line CCD sensor with no filter. The monochrome line CCD sensor 29 outputs a black (BK) or a white (W) signal.

Figure 3:
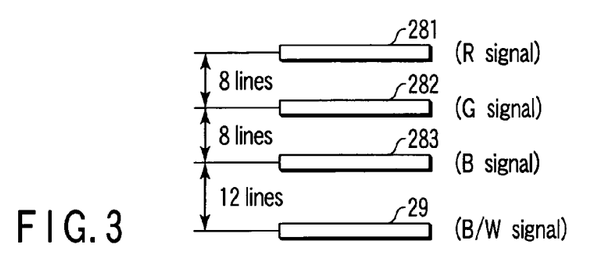
FIG. 3 shows the spacing between the image reading lines of the line CCD sensor.

FIG. 3 shows the spacing between the image reading lines of the 4-line CCD sensor section. The line CCD sensors 281, 282, 283 in the color line CCD sensor 28 are arranged at intervals of 8 lines. The monochrome line CCD sensor 29 is provided 12 lines away from the line CCD sensor 283 of the color line CCD sensor 28. One line corresponds to the distance which the scanning motor moves in one step. For example, when the read resolution is 600 dpi (dots per inch), one line is 0.042333 mm in width.

Figure 4:
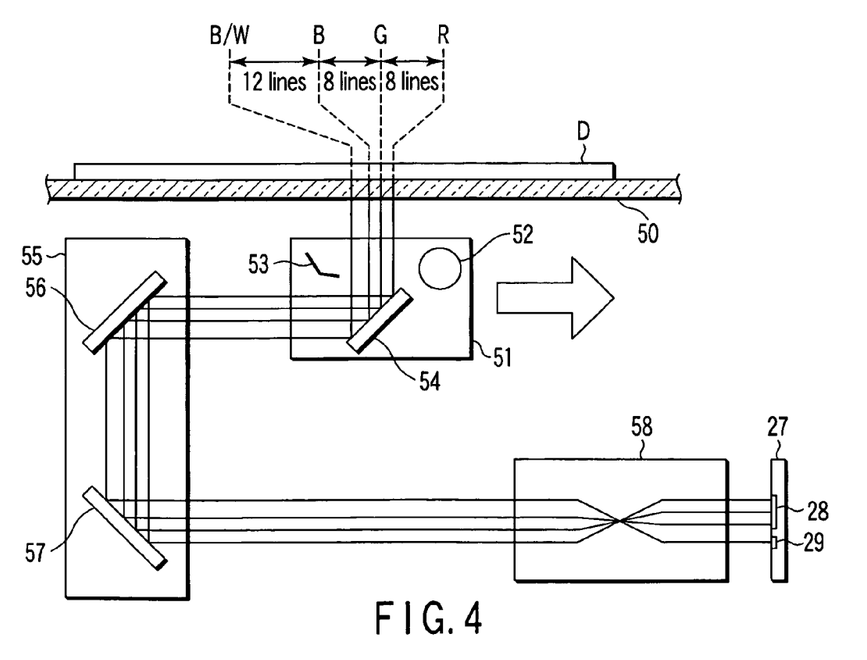
FIG. 4 shows the configuration for reading images from a document.

FIG. 4 shows the configuration for reading images from a document on the scanner section 20. The scanner section 20 is provided with a document table 50 composed of transparent glass on which a document D is placed. Below the document table 50, a first carriage is provided so as to be movable in parallel with the document table 50. The first carriage 51 is designed to move back and forth under the document table 50 by means of the scanning motor via a toothed belt (not shown). For example, a stepping motor is used as the scanning motor. The first carriage 51 includes an exposure lamp 52 serving as a light source to illuminate the document D, a reflector 53 for reflecting illumination from the exposure lamp 52 to the document D on the document table 50, and a first mirror 54 for reflecting the reflected light from the document D in a specific direction.

Below the document table 50, a second carriage capable of moving in parallel with the document table 50 is provided. On the second carriage 55, a second mirror 56 and a third mirror 57 are provided in such a manner that they make a right angle with each other. The second mirror 56 and third mirror 57 reflect sequentially the reflected light from the document D reflected from the first mirror 54. The second carriage 55 is not only driven according to the first carriage by the toothed belt driving the first carriage 51 but also moved in parallel with the document table 50 at, for example, half the speed of the first carriage 51.

Below the document table 50, there are provided an image forming lens 58 for condensing the reflected light from the third mirror 57 on the second carriage 55 and the 4-line CCD sensor section 27 for receiving the reflected light condensed by the image forming lens 58 and converting it photoelectrically. The image forming lens 58, which is provided in a plane including the optical axis of the light reflected by the third mirror 57 so as to be movable via a driving mechanism, moves itself, thereby forming an image from the reflected light at a desired magnification. Then, the 4-line CCD sensor section 27 converts the incident reflected light photoelectrically and outputs an electric signal corresponding to the read document D. The 4-line CCD sensor section 27 is provided perpendicular to the document table 50 so that the color line CCD sensor 28 may be located in the upper part and the monochrome line CCD sensor 29 may be located in the lower part in FIG. 4. In the color line CCD sensor 28, the line CCD sensors 281, 282, 283 are arranged at intervals of 8 lines as described above. Therefore, the line CCD sensor 282 reads the position 8 lines away from the position of the document image being read by the line CCD sensor 281, toward the trailing edge in the image reading direction. In addition, the line CCD sensor 283 reads the position 8 lines away from the position of the document image being read by the line CCD sensor 282, toward the trailing edge in the image reading direction. Furthermore, in the 4-line CCD sensor section, the monochrome line CCD sensor is provided 12 lines away from the color line CCD sensor toward the trailing edge in the image reading direction. Therefore, the monochrome line CCD sensor 29 reads the position 12 lines away from the position of the document image being read by the line CCD sensor 283, toward the trailing edge in the image reading direction.

Figure 5:
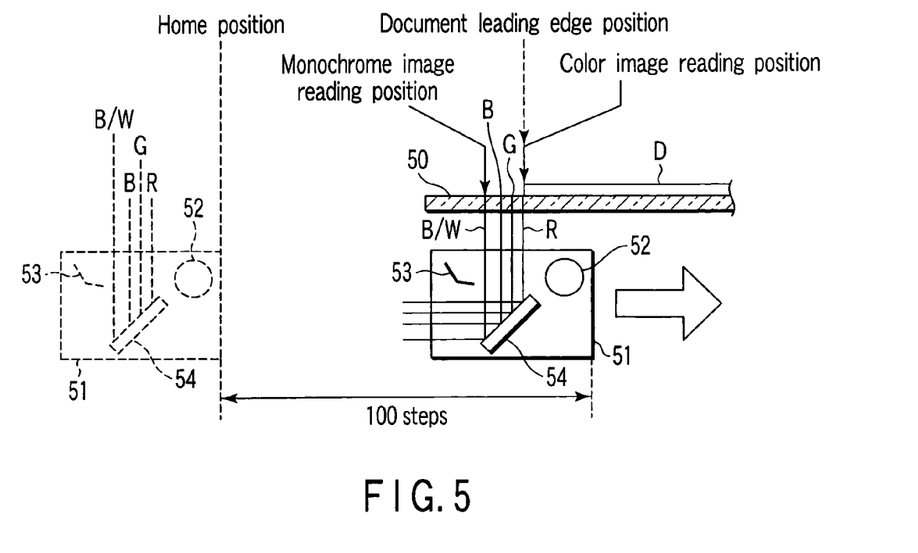
FIG. 5 shows the operation of the carriage at the start of image reading.

FIG. 5 is a diagram to help explain the operation of the first carriage 51 at the start of document image reading. In the standby state, the first carriage 51 is standing by in the home position. When receiving a scan start command from the main CPU 11, the scanner CPU 21 controls the scanning motor driver 25, thereby starting to drive the scanning motor. As a result, the first carriage 51 starts to move in the image reading direction as shown by the arrow in FIG. 5. The first carriage 51 is such that, when the scanning motor is driven 100 steps, the optical axis for inputting to the line CCD sensor 281 is located at the document leading edge, and when the scanning motor is further driven 28 steps, the optical axis for inputting to the monochrome line CCD sensor 29 is located at the document leading edge.

Figure 6:
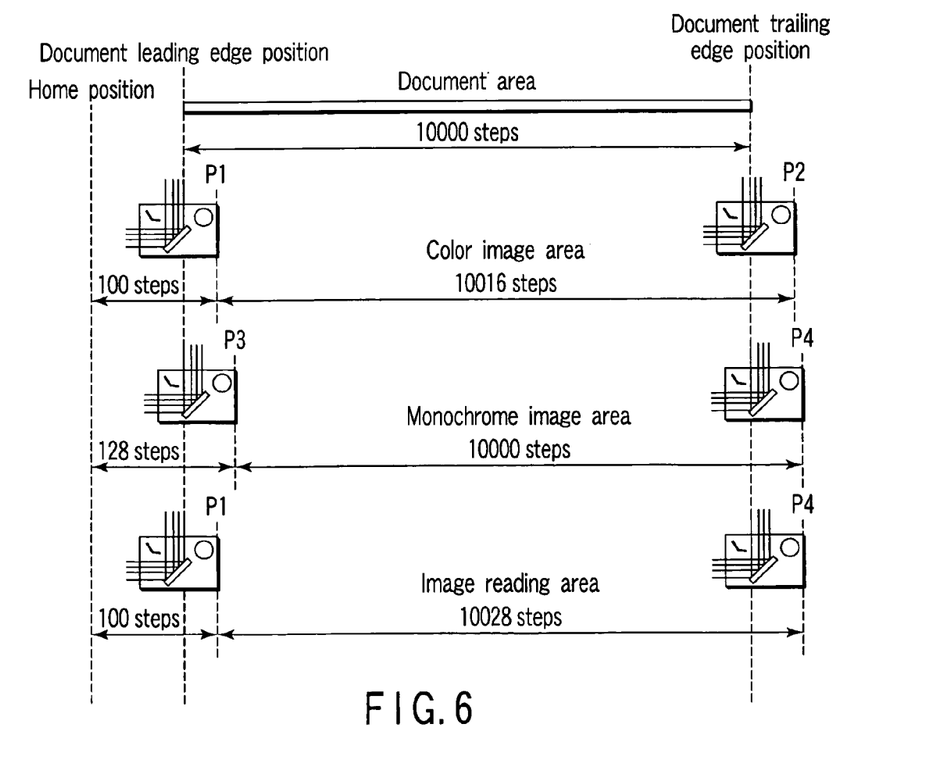
FIG. 6 is a diagram to help explain the document image reading area.

FIG. 6 is a diagram to help explain the image reading area of the document D placed on the document table 50. The document D has an area that allows, for example, the leading edge to trailing edge of the document to be read, when the scanning motor moving the first carriage 51 is driven 10000 steps. First, the area over which the first carriage 51 moves to read a color image from the document D in the color mode will be explained. As explained by reference to FIG. 5, when the scanning motor is driven 100 steps, the optical axis for inputting to the line CCD sensor 281 reaches the leading edge of the document D. After the scanning motor is driven 10016 steps following the arrival at the leading edge, the optical axis for entering the line CCD sensor 283 reaches the trailing edge of the document D. Therefore, the area over which the first carriage 51 is moved by the driving of the scanning motor from 100 steps to 10016 steps is the area necessary to read a color image. Next, the area over which the first carriage 51 moves to read a monochrome image from the document D in the monochrome mode will be explained. When the scanning motor has been driven 128 steps, the optical axis for inputting to the monochrome line CCD sensor 29 reaches the leading edge of the document D. After the scanning motor is driven 10000 steps following the arrival at the leading edge, the optical axis for inputting to the monochrome line CCD sensor 29 reaches the trailing edge of the document D. Therefore, the area over which the first carriage 51 is moved by the driving of the scanning motor from 128 steps to 10128 steps is the area necessary to read a monochrome image. Next, the image reading area will be explained. As for the start of image reading, the reading of a color image by the color line CCD sensor 28 and the reading of a monochrome image by the monochrome line CCD sensor 29 are started with the same timing, regardless of whether the reading mode is the color mode or the monochrome mode. As shown in FIG. 6, when the scanning motor has been driven 100 steps, the optical axis for entering the line CCD sensor 281 reaches the leading edge of the document D. At this time, the reading of an image by the color line CCD sensor 28 and the reading of an image by the monochrome line CCD sensor 29 are started at the same time. Then, after the 4-line CCD sensor has started to read an image, when the scanning motor has been driven 10028 steps, the optical axis for inputting to the monochrome line CCD sensor 29 reaches the trailing edge of the document D. At this time, the reading of the image by the color line CCD sensor 28 and the reading of the image by the monochrome line CCD sensor 29 are ended at the same time. This makes it possible to cover all of the image reading area, regardless of whether the reading mode is the color mode or the monochrome mode. Since the position at which the image reading is started and the position at which the image reading is ended are the same, it is not necessary to change the timing of starting to read the image, depending on the reading mode. Therefore, it is possible to reduce the control load in image reading.

Figure 7:
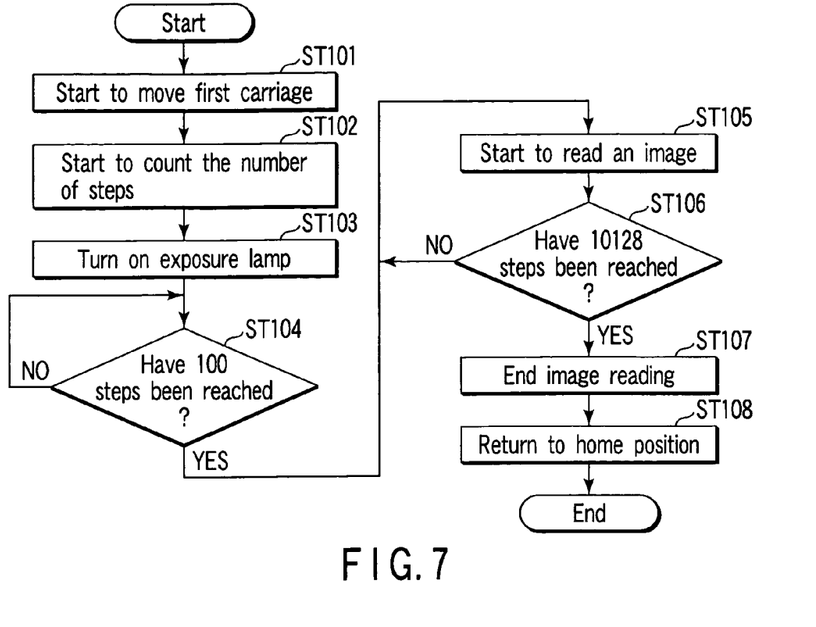
FIG. 7 is a flowchart for an image reading process carried out by the scanner CPU.

FIG. 7 is a flowchart for an image reading process carried out by the scanner CPU 21 in image reading. When receiving an image read command from the main CPU 11, the scanner CPU 21 starts the process. First, the scanner CPU 21 controls the scanning motor driver 25 to cause the first carriage 51 standing by in the home position to start to move in the image reading direction (ST101), thereby starting to count the number of steps of the scanning motor (ST102) and then turning on the exposure lamp 52 (ST103). Then, it is determined whether the number of steps of the scanning motor has reached 100 steps (ST104). If it is determined that 100 steps have been reached, the scanner CPU 21 starts to read an image (ST105). Then, it is determined whether the number of steps of the scanning motor has reached 10128 steps (ST106). If it is determined that 10128 steps have not been reached, the image reading process is continued. If it is determined that 10128 steps have been reached, the image reading process is ended (ST107). Then, the scanner CPU 21 controls the scanning motor driver 25, thereby returning the first carriage 51 to the home position (ST108). This completes the image reading process. After the image signal is subjected to image processing at the image correcting section 26, the resulting signal is stored in units of one page of data in the page memory 18 via the image data bus and the like.

The area which stores the image data read as described above corresponds to 10028 steps, whereas the document area corresponds to 10000 steps. Therefore, when outputting the data to the printer 30, it is necessary to cut the unnecessary image area according to the image reading mode specified from the operation key 41 of the operation panel 40.

Figure 8:
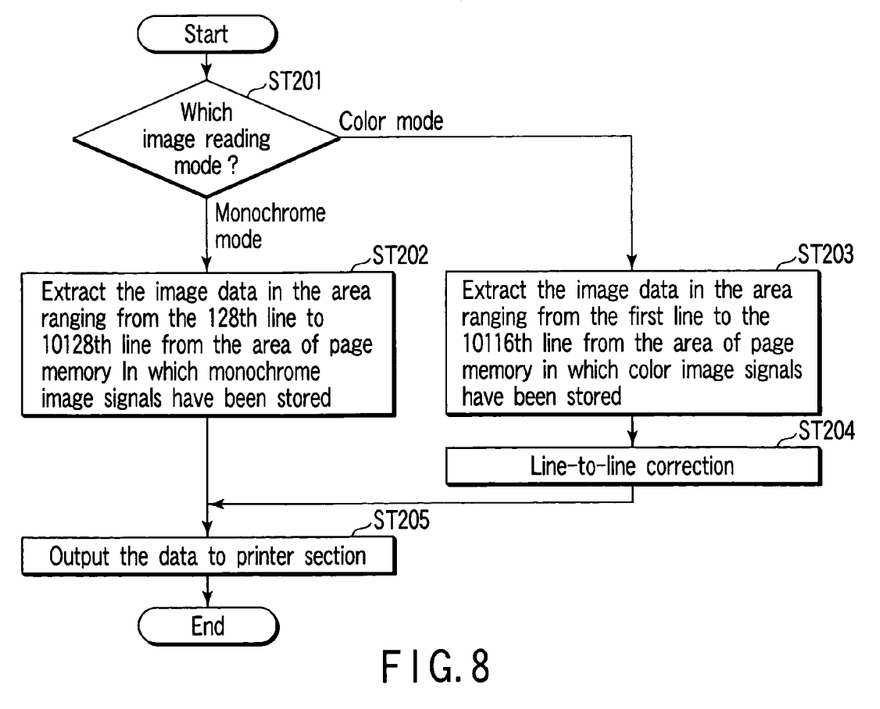
FIG. 8 is a flowchart for the process of extracting the image area stored in the page memory.

Hereinafter, explanation will be given about the process of extracting the necessary image area according to the reading mode from the area of the page memory 18 in which the monochrome image data and color image data have been stored. FIG. 8 is a flowchart for the process of extracting the image data stored in the page memory 18 to be executed by the main CPU 11.

First, the image reading mode is judged on the basis of the instruction input to the operation panel 40 (ST201). If it is determined that the image reading mode is the monochrome mode, the data in the area from a 128th line to a 10128th line of the page memory 18 in which the monochrome image data has been stored is extracted (ST202). On the other hand, if it is determined that the image reading mode is the color mode, the data in the area from a 100th line to a 10116th line of the page memory 18 in which the color image data has been stored is extracted (ST203). Then, the color image data in the extracted area is subjected to a line-to-line correcting process of correcting the difference in line between R data, G data, and B data (ST204). The monochrome image data extracted in step ST202 or the color image data subjected to the line-to-line correcting process in step ST204 is output to the printer section 30 (ST205). On the basis of the image data output as described above, an image is formed at the printer section 30.

Here, the line-to-line correction will be explained. In the color line CCD sensor 28, the line CCD sensors 281, 282, 283 are arranged at intervals of 8 lines. Therefore, it is necessary to adjust the phases according to the transfer speed in the image reading direction. If the sensors are arranged at intervals of 8 lines and the magnification is changed in the range of 25% to 400%, a positional correction of 2 to 32 lines is needed between the R signal output from the line CCD sensor 281 and the G signal outputted from the line CCD sensor 281 and between the G signal output from the line CCD sensor 282 and the B signal output from the line CCD sensor 283. Therefore, with the B signal output from the line CCD sensor 283 as a reference, a positional adjustment of 4 to 64 lines is made to the R signal and a positional adjustment of 2 to 32 lines is made to the G signal. The process of making the positional adjustment is called a line-to-line correction. As a result of the line-to-line correction, the RGB images are superimposed one on top of another, which forms a color image.

By doing such processing, even when the image is read from the document with the same timing of image reading at the scanner section 20, regardless of the reading mode, suitable image data can be output to the printer section 30.

Second Embodiment

Next, a second embodiment of the present invention will be explained. The same parts as those in the first embodiment are indicated by the same reference numerals and a detailed explanation of them will be omitted. The second embodiment differs from the first embodiment in that the process of extracting the signal in the necessary image area according to the reading mode, before the image signal read at the 4-line CCD sensor section 27 is stored in the page memory 18. Since the remaining configuration is the same as that of the first embodiment, explanation of it will be omitted.

Figure 9:
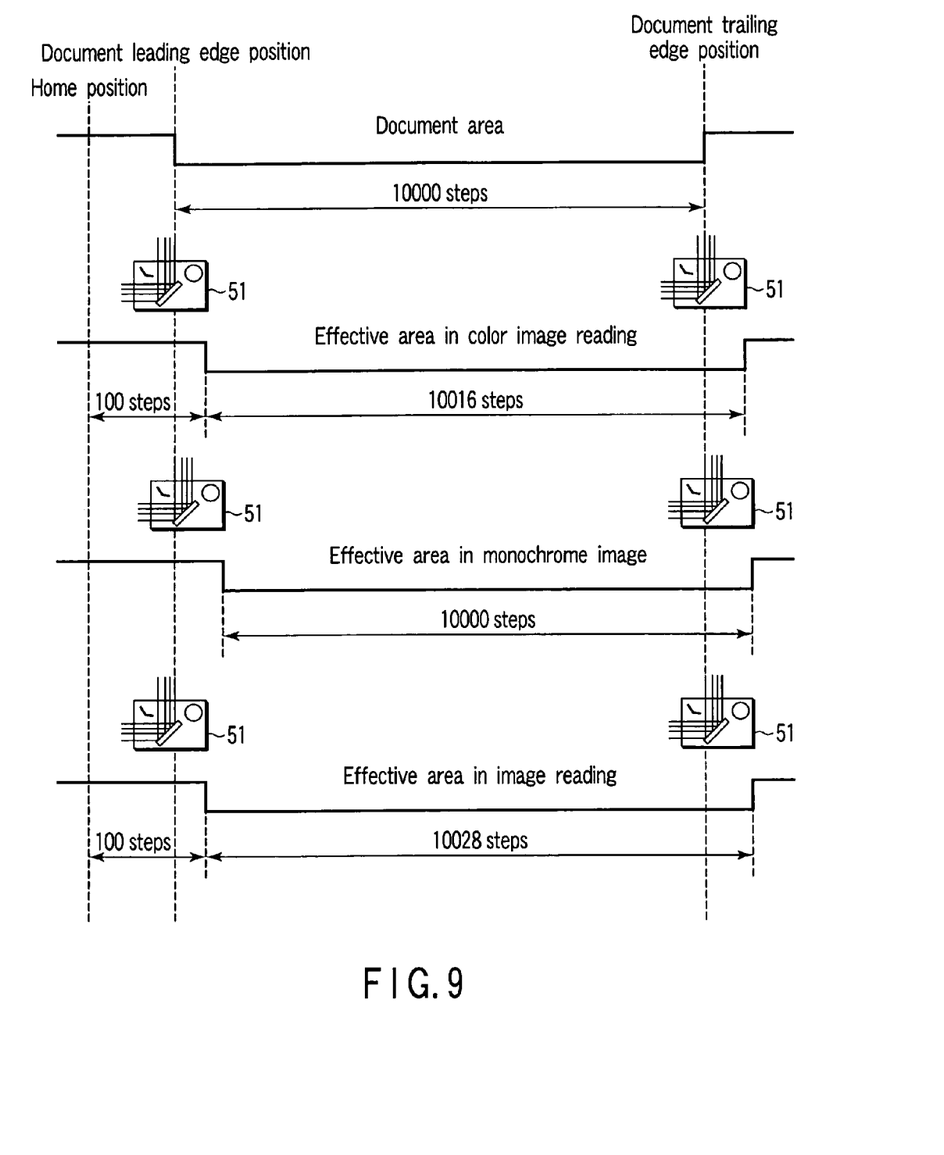
FIG. 9 shows a signal to indicate whether to make the read-out images effective or ineffective in a second embodiment of the present invention.

FIG. 9 shows a signal to indicate whether to make effective or ineffective the image signal read in extracting the signal in the image area according to the reading mode. As in the explanation by reference to FIG. 6, explanation will be given using a case where the area of the document D corresponds to 10000 steps. The area necessary to read a color image is the area over which the first carriage 51 is moved by the driving of the scanning motor from 100 steps to 10016 steps. Therefore, the image signals read by the color line CCD sensor 28 in the meantime are made effective. In addition, the area necessary to read a monochrome image is the area over which the first carriage 51 is moved by the driving of the scanning motor from 128 steps to 10128 steps. Therefore, the image signals read by the monochrome line CCD sensor 29 in the meantime are made effective. Moreover, the document image reading area is the area over which the first carriage 51 is moved by the driving of the scanning motor from 100 steps to 10128 steps, regardless of the reading mode. Therefore, the image signals read in the meantime are made effective.

Figure 10:
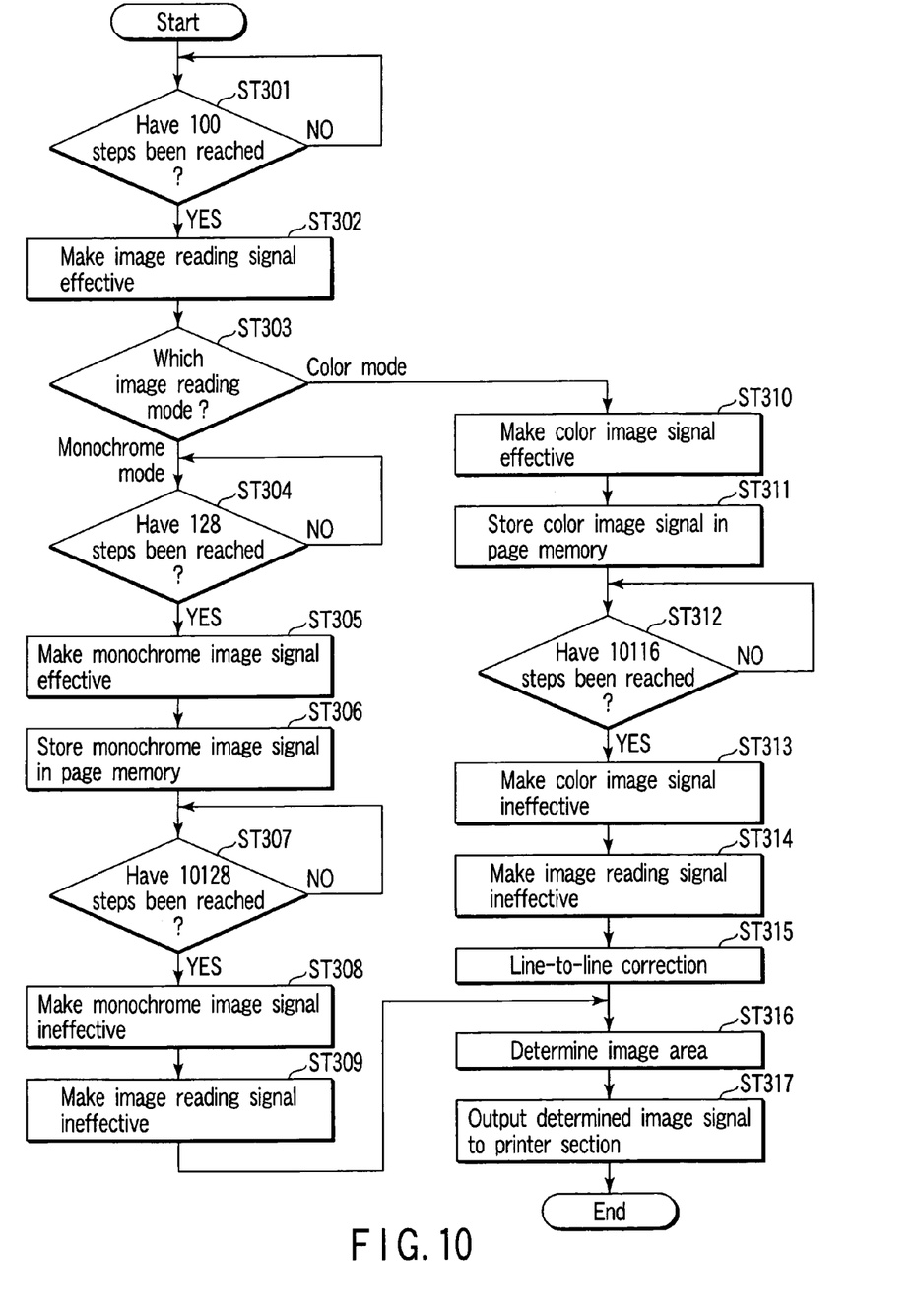
FIG. 10 is a flowchart for the process of extracting the necessary image area according to the reading mode before storing the image data in the page memory.

FIG. 10 is a flowchart for the process of the main CPU 11 extracting the signal in the necessary image area according to the reading mode before storing the image data in the page memory 18. Therefore, this process is carried out in synchronization with the image reading process explained by reference to FIG. 7.

First, the main CPU 11 monitors the scanner section 20 and determines whether the number of steps of the scanning motor has reached 100 steps (ST301). If the result of the determination is NO, the main CPU 11 continues monitoring the scanner section 20. If the result of the determination is YES, the main CPU 11 makes effective the image signals read by the 4-line CCD sensor section 27 (ST302). Then, on the basis of the instruction from the operation panel 40, the image reading mode is judged (ST303). If it is determined that the reading mode is the monochrome mode, the main CPU 11 continues monitoring the scanner section 20 and determines whether the number of steps of the scanning motor has reached 128 steps (ST304). If the result of the determination is NO, the main CPU 11 continues monitoring the scanner section 20. If the result of the determination is YES, the main CPU 11 makes effective the monochrome image signals read by the monochrome line CCD sensor 29 (ST305). The main CPU 11 stores the read monochrome image signal in the page memory 18 (ST306). Then, the main CPU 11 determines whether the number of steps of the scanning motor has exceeded 10128 steps (ST307). If the result of the determination is NO, the main CPU 11 continues storing the monochrome image signals in the page memory 18. If the result of the determination is YES, the main CPU 11 makes ineffective the image signals read by the monochrome line CCD sensor 29 (ST308). In addition, the image reading signal is made ineffective with almost the same timing of the process of making the monochrome image signal ineffective (ST309). In this way, one page of monochrome image signals is stored in the page memory 18 as monochrome image data.

On the other hand, if it has been determined in step ST203 that the reading mode is the color mode, the main CPU 11 makes effective the color signals read by the color line CCD sensor 28 (ST310). The main CPU 11 stores the read color signals in the page memory 18 (ST311). Then, the main CPU 11 determines whether the number of steps of the scanning motor has reached 10116 steps (ST312). If the result of the determination is NO, the main CPU 11 continues storing the color image signals in the page memory 18. If the result of the determination is YES, the main CPU 11 makes ineffective the color image signals read by the color line CCD sensor 28 (ST313). In addition, the image reading signal is made ineffective with almost the same timing of the process of making the color image signals ineffective (ST314). The main CPU 11 subjects the color image signals stored in the page memory 18 to a line-to-line correcting process of correcting the difference in line between the RGB signals (S315). In this way, one page of color image signals is stored in the page memory 18 as color image data.

The main CPU 11 determines the image area using the image data stored in the page memory 18 according to the reading mode (ST316). Then, the image data in the determined image area is output to the printer section 30 (ST217). On the basis of the image data output this way, an image is formed at the printer section 30.

By doing such processing, even when the image is read from the document with the same timing of image reading at the scanner section 20, regardless of the reading mode, suitable image data can be output to the printer section 30.

Third Embodiment

Next, a third embodiment of the present invention will be explained. The same parts as those in the first embodiment are indicated by the same reference numerals and a detailed explanation of them will be omitted. The third embodiment differs from the first embodiment in that the process of extracting the signal in the necessary image area according to the reading mode is carried out in hardware.

Figure 11:
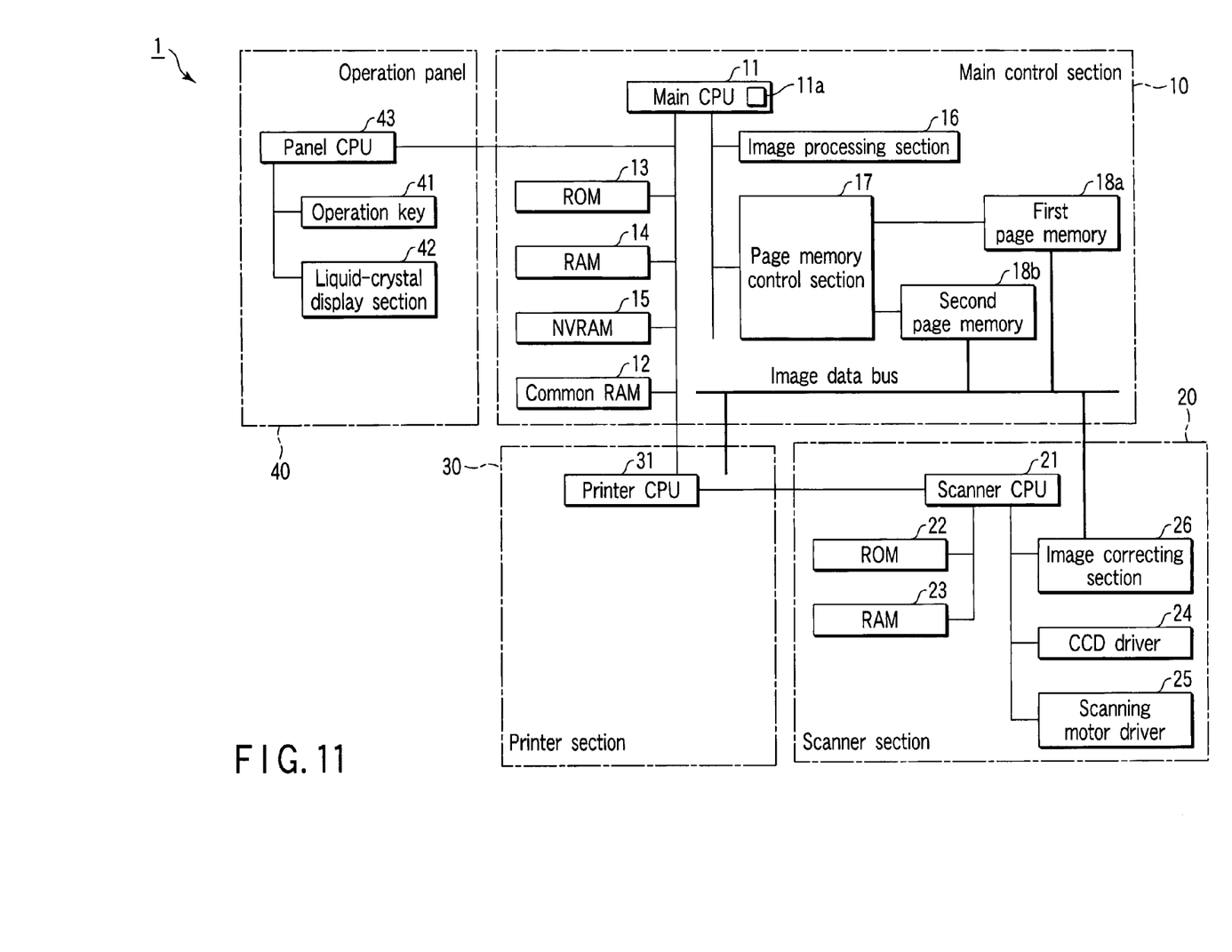
FIG. 11 is a block diagram schematically showing the electrical connection of an image reading apparatus according to a third embodiment of the present invention and the flow of control signals.

FIG. 11 is a block diagram schematically showing the electrical connection of the image reading apparatus 1 and the flow of control signals. In the main control CPU 11, there is provided a counter 11a for counting the number of steps by which the scanning motor of the scanner CPU 21 section is driven. In addition, a first page memory 18a and a second page memory 18b are provided between the page memory control section 17 and the image data bus. In the first page memory 18a, an area is formed in which the image signal readable when the scanning motor has been driven 10000 steps is to be stored. The first page memory 18a is provided to store one page of monochrome image signals as monochrome image data. In the second page memory 18b, an area is formed in which the image signal readable when the scanning motor has been driven 10016 steps is to be stored. The second page memory 18b is provided to store one page of color image signals as color image data. Since the remaining configuration is the same as that of the first embodiment, explanation of it will be omitted.

The main CPU 11 sends a read start command to the scanner section 20 and at the same time, instructs the counter 11a to start to count the number of steps of the scanning motor in the scanner section 20. Then, the main CPU 11 makes the image reading signal effective when the count of the counter 11a has reached 100 steps. When the image reading signal becomes effective, the scanner section 20 inputs the color image signal read by the color line CCD sensor 28 and the monochrome image signal read by the monochrome line CCD sensor 29 to the main control section 10. In addition, when the count of the counter 11a has reached 10128 steps, the main CPU 11 makes the image reading signal ineffective. The timing of making the color image signal effective and the timing of making the monochrome image signal effective are as explained in the above embodiments.

Figure 12:
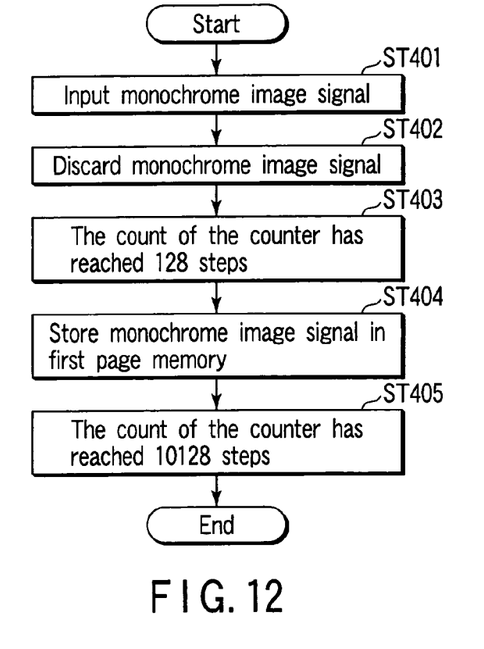
FIG. 12 is a flowchart for the processing of a monochromatic image signal.
Figure 13:
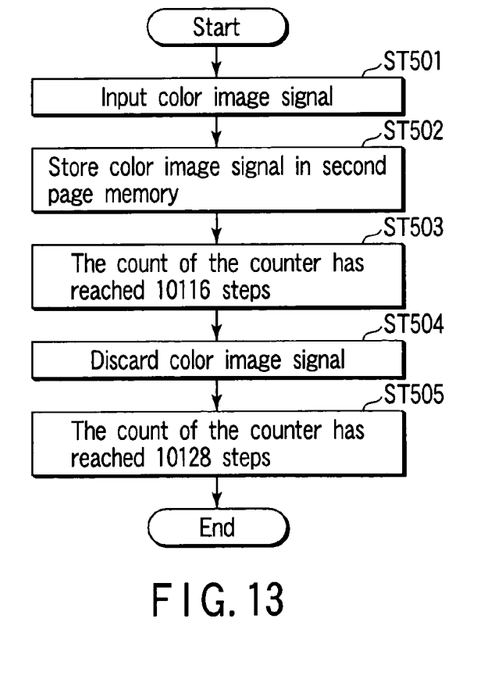
FIG. 13 is a flowchart for the processing of a color image signal.

FIGS. 12 and 13 are flowcharts for the processing of the image signals input as described above.

FIG. 12 is a flowchart for the processing of a monochrome image signal input to the first page memory 18a. When the counter 11a has reached 100 steps, the monochrome signal is input to the first page memory 18a (ST401). At this time, since the image reading signal is effective but the monochrome signal is ineffective, the monochrome image signal input to the first page memory 18a is discarded (ST402). Then, when the count of the counter 11a has reached 128 steps (ST403), the monochrome image signal becomes effective, with the result that the monochrome image signal is stored in the first page memory 18a (ST404). Then, when the count of the counter 11a has reached 10128 steps (ST405), not only the monochrome image signal but also the image reading signal becomes ineffective, which ends the process of storing the monochrome image signal in the first page memory 18a. As a result, just as many monochrome image signals as correspond to the storage area are stored in the first page memory 18a as monochrome image data.

FIG. 13 is a flowchart for the processing of a color image signal input to the second page memory 18b. When the counter 11a has reached 100 steps, the color image signal is input to the second page memory 18b (ST501). At this time, since not only the image reading signal but also the color image signal is effective, the color image is stored in the second page memory 18b (ST502). Then, when the count of the counter 11a has reached 10116 steps (ST503), the color image signal becomes ineffective, with the result that the color image signal input to the second page memory 18 is discarded (ST504). Then, when the count of the counter 11a has reached 10128 steps (ST505), the image reading signal becomes ineffective, which ends the process of storing the color image signal in the second page memory 18b. As a result, just as many color image signals as correspond to the storage area are stored in the second page memory 18b as color image data.

Either the monochrome image data stored in the first page memory 18a or the color image data stored in the second page memory 18b is output to the printer section 30 according to the reading mode. On the basis of the image data output this way, an image is formed at the printer section 30.

By doing such processing, even when the image is read from the document with the same timing of image reading at the scanner section 20, regardless of the reading mode, suitable image data can be output to the printer section 30.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the invention as defined by the appended claims and equivalents thereof.

What is claimed is:

1. An image reading apparatus, comprising:
a sensor section which includes a color line sensor which reads a color image and a monochrome line sensor which reads a monochrome image provided in parallel with and a specific distance away from the color line sensor;
an input section which inputs a document image to the color line sensor and the monochrome line sensor;
a control section which, when reading an image from a document by use of the input section, starts the reading of an image by the color line sensor and the reading of an image by the monochrome line sensor with the same timing;
a counter which counts a number corresponding to the specific distance by which the color line sensor and the monochrome line sensor are separated;
a first storage section which stores an image read by the monochrome line sensor;
a second storage section which stores an image read by the color line sensor; and
a start control section which starts to store an image read by either the color line sensor or the monochrome line sensor provided in a position corresponding to the trailing edge in the image reading direction of the sensor section, after the counter has counted the number corresponding to the specific distance.

2. An image reading method, comprising:
accepting an instruction to read an image from a document;
starting the reading of an image by a color line sensor and the reading of an image by a monochrome line sensor provided in parallel with and a specific distance away from the color line sensor with the same timing;
counting a number corresponding to the specific distance by which the color line sensor and the monochrome line sensor are separated; and
storing image data read by either the color line sensor or the monochrome line sensor provided on the trailing edge side in the image reading direction, after the number corresponding to the specific distance is counted.

3. The image reading method according to claim 2, further comprising:
discarding the image data read by either the color line sensor or the monochrome line sensor provided on the trailing edge side in the image reading direction, before the number corresponding to the specific distance is counted.

* * * * *